Sept. 12, 1939.  L. MERZ  2,172,961
SELF-COMPENSATING AMPLIFIER
Filed April 2, 1937
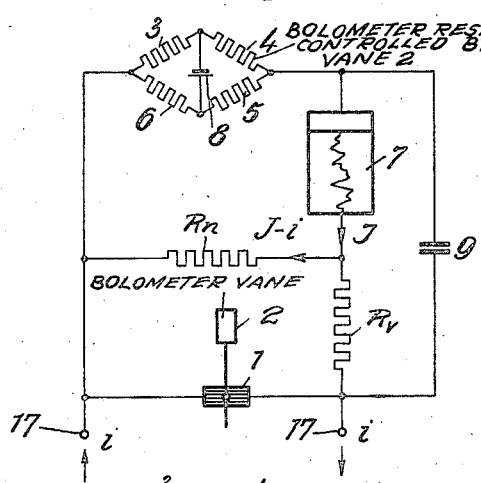
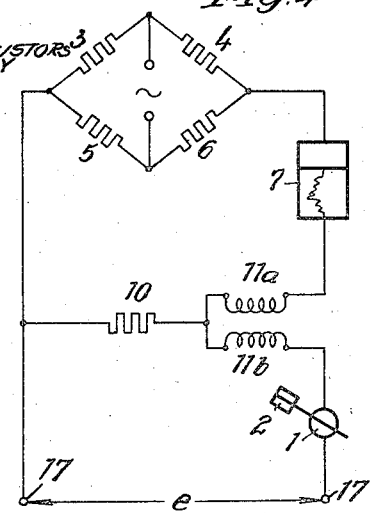
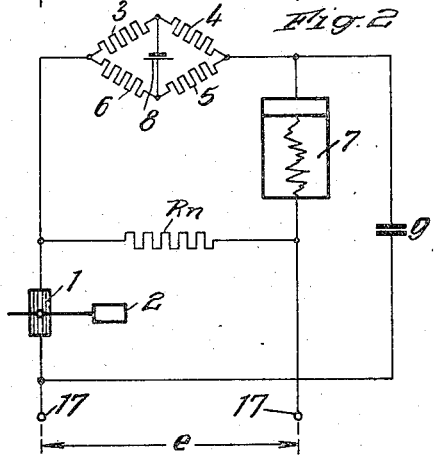
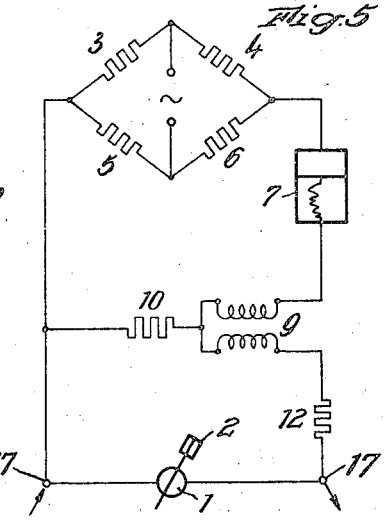
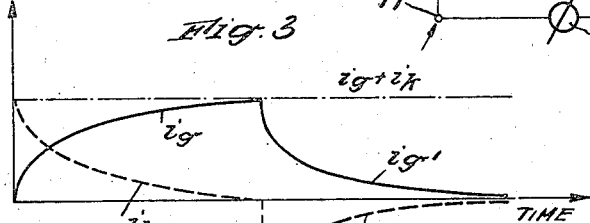
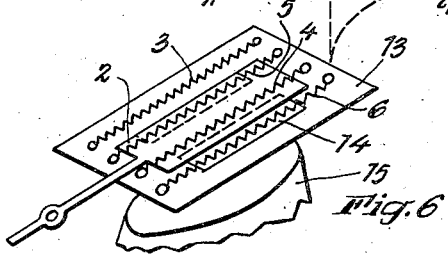

Patented Sept. 12, 1939

2,172,961

UNITED STATES PATENT OFFICE 2,172,961

SELF-COMPENSATING AMPLIFIER

Ludwig Merz, Berlin-Haselhorst, Germany, assignor to Siemens & Halske, Aktiengesellschaft, Siemensstadt, near Berlin, Germany, a corporation of Germany Application April 2, 1937, Serial No. 134,510
In Germany April 3, 1936

11 Claims. (Cl. 171—95)

My invention relates to a self-compensating amplifier.

Such amplifiers for electric currents or voltages are well known in which the input magnitude influences the measuring mechanism of a galvanometer which controls a resistance arrangement supplied with energy by an auxiliary power source. The auxiliary power source produces an amplified current which traverses a device utilizing the current, for instance, an ink recorder for recording the input magnitude.

Such amplifiers present, as a rule, a certain sluggishness. If, for instance, a bolometer connection is employed as a resistance arrangement and the resistances of which are heated by the auxiliary power source and are cooled by a current of air controlled by the measuring mechanism of the galvanometer, a certain time elapses when the input magnitude varies until the current distribution in the bolometer arrangement has adapted itself to the corresponding adjustment of the measuring instrument of the galvanometer. Consequently, a hunting of the galvanometer measuring mechanism occurs which renders impossible a reliable operation of the amplifier.

According to the invention, this drawback is removed by a condenser which is so connected and rated that the voltage drop across a resistor transversed by the amplified current creates charging and discharging currents which are directly supplied to the measuring mechanism and which are of such a magnitude that the effect of the sluggishness of the amplification process on the measuring mechanism is substantially compensated for. In this manner by a proper rating of the condenser the sluggishness of the amplification process does not influence the measuring mechanism of the galvanometer.

It is, however, also possible to employ a transformer in whose primary winding the amplified current flows and in whose secondary winding a voltage is induced which depends upon the variation of the primary current and is added to the voltage drop across a shunt resistance connected in series with the secondary winding.

In the accompanying drawing is shown four embodiments of my invention in diagrammatic form.

Fig. 1 shows an arrangement for recording an electric current $i$.

Fig. 2 shows a similar arrangement for recording an electric voltage $e$, and

Fig. 3 shows a graphic representation for explaining the operation of the arrangements shown in Figs. 1 and 2.

Fig. 4 shows an arrangement of another type for recording an electric voltage $e$.

Fig. 5 shows an arrangement similar to Fig. 4 for recording an electric current $i$.

Fig. 6 illustrates the spatial relation of the bolometer elements of the arrangements shown in Figs. 1, 2, 4 and 5.

In Fig. 1 the moving coil 1 of a galvanometer whose pointer is provided with a vane 2 is connected to the input terminals 17 for the current $i$ to be amplified. The galvanometer is inserted in a circuit in which a comparatively small resistor $R_n$ and a comparatively large resistor $R_v$ are included. The series connection of an ink recorder 7 and of a bolometer arrangement consisting of the resistors 3, 4, 5, 6 is connected to the terminals of the resistor $R_n$. The bolometer resistors are connected with one another in the form of a bridge connection which is connected to the direct-current source 8.

The bolometer resistors are so arranged in a manner well known that the vane 2 covers more or less either the resistors 3 and 5 or the resistors 4 and 6 depending upon its position, thus protecting them against the cooling effect of an air stream which is produced in any suitable manner and directed against the resistors 3, 4, 5 and 6.

Figure 6 shows as example the spatial arrangement of the bolometer resistors 3, 4, 5 and 6, the vane 2 and of the means for producing an air current. This arrangement is in itself well known in the art and for instance described in United States Patent No. 1,944,721 to H. Sell. The resistors 3, 4, 5 and 6 are arranged before the nozzle 15 of an air blower of any appropriate type. A plate 13 having slots 14 serves to restrict the air current and to direct it against the resistors. The resistance of the resistors heated by the current source 8 varies greatly according to their temperature and therefore depends on the cooling influence of the air current. Instead of the arrangement shown in Figure 6, other constructions may be used; for instance, only two of the four resistors may be exposed to the air current.

When the vane 2 is in its neutral position, both sets of resistors 3, 5 and 4, 6 are cooled in the same degree. When the vane 2 moves in either direction, one set is cooled more than the other. Thus the resistances are changed accordingly.

It may now be assumed that in the arrangement of Figure 1 the vane 2 is in its neutral position. In that case, no current is flowing in the coil 1, and the input current $i$, having a definite value, is compensated by a current of equal value supplied from the auxiliary source 8. The compensating current forms, as may be seen from the circuit of Figure 1, only a small part of the whole auxiliary current J coming from the bridge arrangement and flowing through the instrument 7. Therefore in that balanced state the current J which actuates the instrument 7 and which is indicated thereby, is much greater than the compensated current $i$ ($J$=amplified current).

Since, as mentioned before, no current flows through the galvanometer coil 1 in the balanced state of the arrangement, the following equation applies to that state:

$$i.R_v = (J-i).R_n$$

Herein, J is the amplified current which is recorded by the ink recorder.

It follows:

$$J.R_n = i.R_v + iR_n$$

or $$J = i \cdot \frac{R_v + R_n}{R_n}$$

i. e., the current J is proportional to $i$ and amplified in proportion to $$\frac{R_v + R_n}{R_n}$$

If now the input current $i$, for instance, increases, a current flows through the galvanometer coil and moves the vane 2, for instance, to the right. In this manner the current distribution in the bolometer connection is varied until the compensating current produced by the auxiliary source has also increased accordingly and the balance is reestablished. While the balancing current increases, the vane 2 returns to its neutral position as the differential current flowing through coil 1 decreases.

Owing to the thermal sluggishness of the bolometer resistors, the above-mentioned balance is effected gradually. The armature of the measuring mechanism of the ink recorder 7 produces a reaction which also results in a certain sluggishness. Consequently, there is the danger that a hunting of the galvanometer system occurs which impairs the recording.

Such hunting, however, is prevented by the condenser 9 connected in parallel to the series arrangement of resistor $R_v$ and recorder 7. The function of this condenser circuit is as follows. If it is assumed that the vane 2 suddenly moves a certain distance, the variation of the resistance of the bolometer connection does not follow this movement instantaneously but gradually; that is to say, the intensity of the current J and, therefore, also the intensity of the current $i_g$ of the galvanometer increases substantially according to an exponential curve as is represented by the curve $i_g$ shown in Fig. 3.

Owing to the voltage drop produced in the resistance of the ink recorder 7 by the current J, a charging current $i_k$ which corresponds to the first derivative of the current J flows in the circuit of the condenser 9, i. e., $$i_k = c \cdot \frac{dJ}{dt}$$

wherein $c$ designates a constant. In this case the charging current $i_k$ decreases according to an exponential curve as is graphically represented in Fig. 3.

If the vane 2 suddenly deflects in the other direction, as indicated by curve $i_g$ in Fig. 3, the current J does not decrease instantaneously but also gradually according to an exponential curve. In this case a discharging current $i_k$ which also decreases according to an exponential curve as shown in Fig. 3 flows in the circuit of the condenser 9.

Since the condenser 9 is so connected that the charging and discharging current $i_k$ and $i_k'$ are superimposed upon the galvanometer current $i_g$ and $i_g'$ the hunting of the galvanometer measuring mechanism will disappear and the mechanism will elastically return into its zero position if the total current $i_g + i_k$ or $i_g' + i_k'$ flowing through the measuring mechanism remains constant. As will be easily seen from Fig. 3 it is possible to rate the condenser 9 in such a manner that this condition is always fulfilled to an approximate degree so that the sluggishness of the amplification process in the measuring mechanism of the galvanometer is compensated for and the variations of the input current $i$ are accurately recorded by the current J with the aid of the ink recorder.

Also the connection for recording a voltage $e$ shown in Fig. 2 operates in substantially the same manner. Here the resistor $R_v$ is omitted. The galvanometer circuit is closed through a resistor $R_n$ which is connected in series with the ink recorder 7 and with the resistance arrangement 3, 4, 5, 6 fed by the auxiliary power source 8 and controlled by the vane 2 of the galvanometer. According to the invention a condenser 9 is connected in parallel relation to the series connection of the galvanometer 1 and of the resistance arrangement. Also in this case it is possible to rate the condenser in such a manner that the sluggishness of the amplification process is compensated for.

In Fig. 4 the voltage $e$ to be measured is applied to a moving coil measuring mechanism 1; for instance, to a galvanometer, whose pointer is provided with a vane 2 which moves over the bridge resistors 3, 4, 5, 6. In the circuit of the galvanometer is inserted a shunt resistor 10, upon whose rating depends the sensitivity of the arrangement. An indicating instrument, preferably an ink recorder 7 to be actuated by the amplified current is series-connected to the bridge arrangement 3, 4, 5, 6. The primary and secondary windings 11a and 11b are series-arranged with the instrument 7 and the galvanometer.

The bolometer resistors 3, 4, 5, 6 are so arranged that the vane 2 of the control measuring mechanism upon being deflected causes variations of the voltage at the diagonal points of the bridge. The variations produce in the measuring mechanism a current $J_2$ which may be determined by the following equation:

$$U_1 = J_2 \cdot \frac{(R_n + R_\delta + R_2)(R_i + R_3 + R_n + R_1) + \frac{d}{dt}\{L_2(R_i + R_3 + R_n + R_1) + L_1(R_n + R_\delta + R_2)\} + L_1 L_2 \left(\frac{d}{dt}\right)^2 - R_n^2 - 2R_n M \frac{d}{dt} - M^2\left(\frac{d}{dt}\right)^2}{R_n + M\frac{d}{dt}}$$

wherein $R_i$ is the inner resistance of the bolometer bridge, $R_s$ the inner resistance of the indicating instrument; $R_1$ the ohmic primary resistance of the transformer, $L_1$ the primary self-induction of the transformer, $R_2$ the ohmic resistance of the secondary winding of the transformer, $L_2$ the secondary self-induction, M the mutual induction of the transformer, $R_\delta$ the resistance of the shunt resistor 10 and $U_1$ the diagonal voltage of the bolometer bridge. Now, $$M = \frac{L_1 + L_2}{2}$$

and $L_1.L_2$ is approximately equal to $M^2$. Further $R_n$ is always small as compared to the other resistances. By neglecting these values it results:

$$U_1 = J_2 \cdot \frac{(R_o+R_2)(R_i+R_s+R_1) + \frac{d}{dt}\{L_2(R_i+R_s+R_1) + L_1(R_o+R_2)\}}{R_n + M\frac{d}{dt}}$$ (Equation A)

If now the vane 2 of the control galvanometer suddenly deflects by a small angle, the voltage $U_1$ does not appear suddenly but according to a time law which results from the heating of the bolometer. The time law may be approximately represented by an exponential function $$U_1 = U_0\left(1 - e^{-\frac{t}{T_1}}\right)$$

where $T_1$ is the reserve time constant of the bolometer. If it is required that the current $J_2$ flowing through the galvanometer follow a similar time law, then $$J_2 = J_0\left(1 - e^{-\frac{t}{T_2}}\right)$$

If these values are substituted in the Equation A, the latter is fulfilled by the following values:

$$M = R_n.T_1; \quad T_2 = \frac{L_2(Ri+Rs+R_1) + L_1(R_o+R_2)}{(Ri+Rs+R_1)(R_o+R_2)}$$

that is to say, if the transformer is so chosen that its mutual induction is approximately equal to the value resulting from the product of the reserve time constant of the bolometer and of the ohmic value of the shunt resistor 10, the thermal sluggishness is compensated for within a residual time $T_2$. The elastic return is then effected properly if the residual amount $T_2$ is smaller than the sluggishness $T_1$ of the bolometer.

The same elastic return may, for instance, also be effected by an arrangement as shown in Fig. 5. In this case the control measuring mechanism 1 is connected to the input terminals 11 for the current $i$ to be amplified and a further resistor 12 having a relatively great resistance is series-connected therewith. The calculation of the mutual induction of the transformer 9 corresponds to that for the connections in Fig. 1.

For the value M, the product $R_n.T_1$ is attained again and the ohmic value of the resistor 12 is besides included in the residual time $T_2$. Also in this case the thermal sluggishness is, therefore, compensated for but for a negligible residual amount.

I claim as my invention:

1. In a self-compensating amplifier system having input terminals for supplying the energy to be amplified and a device to be actuated by amplified energy, the combination of a control galvanometer connected with said input terminals in a branch circuit so as to be influenced by said input energy, an auxiliary electric energy source and a resistor arrangement connected with said device in a second branch circuit, means operatively connected with said galvanometer for varying the resistance of said resistors in dependency on variations of said input energy, said two branch circuits being united to a compensating circuit so that in the balanced state of said circuit the energy to be amplified is compensated by a counter energy supplied by said auxiliary source, a resistance connected in said circuit so as to be traversed by at least part of said amplified energy, and reacting electric means connected with said last resistance and said device, said means being designed to supply to said galvanometer additional energy for compensating substantially the effect of the sluggishness of the amplification on said device.

2. In a self-compensating electric amplifier system, the combination of input terminals, a galvanometer connected with said terminals so as to have its movable member deflected according to the input quantity to be amplified, an electric auxiliary energy source, an arrangement of variable resistors connected with said source, a compensating circuit connecting said resistor arrangement and said galvanometer so as to compensate when in balanced state the effect of said quantity upon said galvanometer by the auxiliary energy passing from said source through said resistor arrangement, means for varying the resistance of said resistor arrangement in order to vary said auxiliary energy, said means being operatively connected with said movable member of said galvanometer, a device connected in said circuit in series with said resistor arrangement so as to be operated by said auxiliary energy, a reactor connected with said circuit so as to supply an additional reactive energy to said galvanometer compensating substantially the effect of the sluggishness of the amplification on said galvanometer.

3. In a self-compensating electric amplifier system, the combination of input terminals, a control galvanometer connected to said terminals so as to have its movable member deflected according to the input quantity to be amplified, an auxiliary current source for supplying the amplified energy, a bolometric arrangement comprising a set of temperature-responsive bolometer resistors, means for cooling said resistors and a movable element for varying the relation of the effect of said cooling means upon the resistors of said set, said resistors being connected with said source and said galvanometer to a compensating circuit so that in the balanced state of said circuit the influence of said quantity on said galvanometer is compensated by the amplified energy passing from said source through said set of resistors, said movable element being operatively connected with said movable member of said galvanometer, a measuring device connected in said circuit so as to be operated by said amplified energy passing from said source through said resistor set, a resistance connected in said circuit, and a condenser connected with said latter resistance and said measuring device, said condenser being dimensioned for supplying said device according to the voltage drop across said latter resistance with charging and discharging currents counteracting the effect of the sluggishness of the amplification on said galvanometer.

4. In a self-compensating electric amplifier system, the combination of input terminals, a control galvanometer connected between said input terminals so as to have its movable member deflected according to the intensity of the input current, an electric auxiliary energy source, a bolometric resistor arrangement connected with said source, a compensating circuit connecting said resistor arrangement and said galvanometer so as to compensate in balanced state the effect of said input current upon said galvanometer by an auxiliary current passing from said source through said resistor arrangement, means for varying the resistance of said resistor arrangement, said means being operatively connected with said movable galvanometer member, a comparatively small resistance connected in said compensating circuit in parallel to said galvanometer and said resistor arrangement, a comparatively large resistance connected in said circuit in series with said galvanometer and said resistor arrangement, a measuring device connected in said circuit in series with said resistor arrangement so as to be operated by said auxiliary current, and a condenser connected in parallel relation to the series connection including said measuring device and said large resistance.

5. In a self-compensating electric amplifier system, the combination of input terminals, a galvanometer connected with said terminals so as to have its movable member deflected in accordance with the input voltage to be amplified, a compensating circuit connected with said galvanometer, said circuit including an auxiliary current source for supplying the amplified current and means for varying the intensity of said current, an operative connection between said means and said movable galvanometer member, a measuring device connected in said compensating circuit so as to be operated by said amplified current, a resistance connected in said circuit in series with said galvanometer, and a condenser connected in parallel relation to said series connection of said galvanometer and said resistance in order to supply said galvanometer with additional energy for compensating at least partially the effect of the sluggishness of the amplification on said galvanometer.

6. In a self-compensating electric amplifier system for operating an electric recording instrument in response to feeble currents, in combination, input terminals, a control galvanometer connected to said terminals so as to be actuated in accordance with the intensity of said currents, a bridge arrangement of temperature-responsive bolometer resistors, means for producing a current of air for cooling said resistors, a movable vane operatively connected with said galvanometer and disposed between said means and said resistors so as to vary the relation of the cooling effect of said means on said bolometer resistors in accordance with the position of said vane, an auxiliary current source connected in the diagonal of said bridge arrangement, a series connection including said instrument and a comparatively large resistor, said series connection being arranged in series with said control galvanometer and said bridge arrangement, a relatively small resistor parallel-connected to said series connection, and a condenser parallel-connected to said series connection in order to supply said galvanometer with additional energy for compensating at least partially the effect of the sluggishness of the amplification on said galvanometer.

7. In a self-compensating electric amplifier system for operating an electric recording instrument in response to low voltages in combination, input terminals, a control galvanometer connected to said terminals so as to be influenced by said voltages, a bridge arrangement of temperature-responsive bolometer resistors, means for producing a current of air for cooling said resistors, a movable vane operatively connected with said galvanometer and disposed between said means and said resistors so as to protect the bolometer resistors arranged opposite to one another in said bridge in a variable degree against said cooling air current depending upon the position of the vane, an auxiliary current source connected in the diagonal of said bridge, said galvanometer and said bridge being series connected with said instrument, a resistor parallel-connected to the series connection including said bridge and said instrument, and a condenser parallel-connected to said series connection of said bridge and said galvanometer.

8. In a self-compensating electric amplifier system, the combination of input terminals, a galvanometer connected with said terminals so as to have its movable member deflected in accordance with the input quantity to be amplified, a compensating circuit connected with said galvanometer, said circuit including an auxiliary current source for supplying the amplified current and means for varying the intensity of said current, an operative connection between said means and said movable galvanometer member, an electric device connected in said compensating circuit so as to be operated by said amplified current in accordance with said input quantity, a resistor connected in said circuit so as to be traversed by at least part of said amplified current, and a transformer having its primary winding connected in series with said resistor and said device, and its secondary winding connected with said galvanometer so as to supply said galvanometer with additional energy for compensating at least partially the effect of the sluggishness of the amplification on said galvanometer.

9. In a self-compensating electric amplifier system, the combination of input terminals, a galvanometer connected with said terminals so as to have its movable member deflected according to the input quantity to be amplified, an auxiliary current source, a bolometric arrangement of temperature-responsive resistors connected with said source, a compensating circuit connecting said resistor arrangement and said galvanometer so as to compensate when in balanced state the effect of said quantity upon said galvanometer by the auxiliary energy passing from said source through said resistor arrangement, means for thermically biasing said resistors, a movable member for varying said bias in order to vary thereby said auxiliary current, said latter member being operatively connected with said movable member of said galvanometer, a device connected in said circuit in series with said resistor arrangement so as to be operated by said auxiliary energy, a resistor connected in said circuit so as to be traversed by at least part of said auxiliary current, and a transformer having its primary winding connected in series with said latter resistor and said device and having its secondary winding connected with said galvanometer so as to cause the voltage induced in said secondary winding and supplied to said galvanometer to compensate the effect of the sluggishness of the amplification on said galvanometer, said transformer being dimensioned for effecting said compensation up to a residual sluggishness smaller than the thermal sluggishness of said bolometric resistor arrangement.

10. In a self-compensating electric amplifier system for operating an electric recording instrument, the combination of input terminals, a control galvanometer connected to said terminals so as to have its movable member deflected according to the input quantity to be amplified, an auxiliary current source for supplying the amplified energy, a bolometric arrangement comprising a set of temperature-responsive bolometer resistors, means for cooling said resistors and a movable element for varying the relation of the effect of said cooling means upon the resistors of said set, said resistors being connected with said source and said galvanometer to a compensating circuit so that in the balanced state of said circuit the influence of said quantity on said galvanometer is compensated by the amplified energy passing from said source through said set of resistors, said movable element being operatively connected with said movable member of said galvanometer, said instrument being connected in said circuit so as to be operated by said amplified energy passing from said source through said resistor set, a transformer having its primary and its secondary windings series-connected with each other and with said instrument and said control galvanometer, and a shunt resistor connected in parallel relation to the series arrangement of said secondary winding and said galvanometer.

11. In a self-compensating electric amplifier system for operating an electric recording instrument by means of low input current, the combination of input terminals, a control galvanometer connected to said terminals so as to be energized according to the input current, an auxiliary current source for supplying a current of greater intensity than that of said input current, a bridge arrangement of bolometer resistors having its diagonal connected with said source, means for producing an air current for cooling said resistors, a movable vane operatively connected with said galvanometer and disposed between said means and said resistors for varying the relation of the cooling effects on said resistors so as to vary the resistance adjustment of said bridge in accordance with the deflections of said galvanometer, said instrument being connected in a common circuit with said resistor arrangement and said galvanometer so as to be energized by said amplified current, a transformer disposed in said circuit so as to have its primary and its secondary windings series connected with each other and with said instrument, an additional resistor connected in series with said galvanometer and said secondary winding, and a shunt resistor disposed in said circuit and connected with a point between said primary and said secondary windings so as to shunt the series arrangement of said secondary winding, said additional resistor and said galvanometer.

LUDWIG MERZ.